3,178,471
NITROACIDS AND SALTS
Robert A. Smiley, Wilmington, Del., assignor to E. I. du Pont de Nemours and Company, Wilmington, Del., a corporation of Delaware
No Drawing. Filed Sept. 19, 1963, Ser. No. 310,148
10 Claims. (Cl. 260—514)

This invention relates to nitro salts, a process for converting them to nitro acids, and to nitro acids obtained thereby.

Amino acids and deriatives thereof are of interest for making polymers. ε-Aminocaproic acid and ω-aminoundecanoic acid, for example, are used for making polyamides widely used in industry. New and improved intermediates for making amino acids are thus of great interest to industry. One such class of intermediates is the class of nitro acids which can be reduced to amino acids.

The present invention comprises new monometal salts of dinitro compounds; a process for oxidizing them to nitro acids by treating them with aqueous nitric acid of from about 10% to about 70% concentration at a temperature from about 25° C. to about 200° C.; and certain new nitro acids formed thereby.

The monometal salts of dinitro compounds of the present invention are represented by the formula (I)
$$\left[ \begin{array}{c} R^1 \\ R-C-CH=NO_2 \\ CH_2NO_2 \end{array} \right]_n M$$

wherein R and $R^1$ are alkyl of up to 20 carbon atoms or where R and $R^1$ taken together are a bridging radical of up to 20 carbon atoms which forms a saturated carbocyclic ring with the quaternary carbon to which it is attached, M is an alkali or alkaline earth metal and $n$ is a number equal to the valence of M (i.e., 1 or 2). In the preferred compounds of the present invention R and $R^1$ are 1–6 carbon alkyl and M is lithium, sodium, or potassium. Putting it another way the

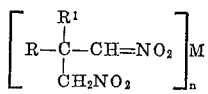

group in Formula I is a quaternary alkylidene

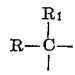

or cycloalkylidene.

It will be understood that when R and $R^1$ are joined in Formulas I and II to form a carbocyclic ring, that ring can also have alkyl, alkoxy, carboxy or other substituents on the ring not oxidized by nitric acid under the reaction conditions in positions other than α to the point of attachment of the —$CH_2NO_2$ and COOH groups. The carbon-containing portion of such substituents can have from 1 to 12 carbon atoms.

The nitro acids formed of the invention are represented by the formula (II)

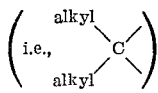

wherein R and $R^1$ have the same significance as in Formula I.

Examples of mononitro salts (I) which can be oxidized to the corresponding nitro acid (II), by the process of the present invention are listed in the following table.

PRODUCT (I)

(1) 2-methyl-2-ethyl-1,3-dinitropropane, monosodium salt
(2) 2-methyl-2-ethyl-1,3-dinitropropane, monopotassium salt
(3) 2-n-propyl-2-isopropyl-1,3-dinitropropane, monosodium salt
(4) 2-n-propyl-2-isopropyl-1,3-dinitropropane, monopotassium salt
(5) 2-n-butyl-2-isobutyl-1,3-dinitropropane, monosodium salt
(6) 2-n-butyl-2-isobutyl-1,3-dinitropropane, monopotassium salt
(7) 2,2-di-sec-butyl-1,3-dinitropropane, monopotassium salt
(8) 2,2-di-n-amyl-1,3-dinitropropane, monopotassium salt
(9) 2-decyl-2-methyl-1,3-dinitropropane, monopotassium salt
(10) 2-n-butyl-2-ethyl-1,3-dinitropropane, monopotassium salt
(11) 2-n-amyl-2-n-propyl-1,3-dinitropropane, monopotassium salt
(12) 1,1-bis(nitromethyl)cyclohexane, monopotassium salt
(13) 1-nitromethyl-1-cyclopentanecarboxylic acid salt
(14) 1,1-bis(nitromethyl)cyclododecane, monopotassium salt
(15) 1,1-bis(nitromethyl)cyclooctane, monopotassium salt
(16) 1,1-bis(nitroethyl)-3-methylcyclohexane, monopotassium salt
(17) 1,1-bis(nitroethyl)-3-cyclohexanecarboxylate, disodium salt
(18) 1,1-bis(nitromethyl)-4-butylcyclohexane, monosodium salt

PRODUCT (II)

(1) α-Methyl-α-ethyl-β-nitropropionic acid
(2) α-Methyl-α-ethyl-β-nitropropionic acid
(3) α-n-Propyl-α-isopropyl-β-nitropropionic acid
(4) α-n-Propyl-α-isopropyl-β-nitropropionic acid
(5) α-n-Butyl-α-isobutyl-β-nitropropionic acid
(6) α-n-Butyl-α-isobutyl-β-nitropropionic acid
(7) α,α-Di-sec-butyl-β-nitropropionic acid
(8) α,α-Di-n-amyl-β-nitropropionic acid
(9) α-n-Decyl-α-methyl-β-nitropropionic acid
(10) α-n-Butyl-α-ethyl-β-nitropropionic acid
(11) α-n-Amyl-α-n-propyl-β-nitropropionic acid
(12) 1-nitromethyl-1-cyclohexanecarboxylic acid
(13) 1-nitromethyl-1-cyclopentanecarbboxylic acid
(14) 1-nitromethyl-1-cyclododecanecarboxylic acid
(15) 1-nitromethyl-1-cyclooctanecarboxylic acid
(16) 1-nitromethyl-3-methyl-1-cyclohexanecarboxylic acid
(17) 1-nitromethyl-3-carboxy-1-cyclohexanecarboxylic acid
(18) 1-nitromethyl-4-n-butyl-1-cyclohexanecarboxylic acid The preparation of dinitroalkanes suitable for making the mono salts of the present invention is described in U.S. Patent 2,383,603.

The metals suitable for making the mono metal salts of the present invention are those elements from groups IA and IIA of the periodic table, i.e., the alkali and alkali earth metals. These include Li, Na, K, Cs, Rb, Ca, Ba, Sr, Be, and Mg. The preferred metals are Li, Na, and K.

The monometal salts of polynitro compounds preferably are prepared by adding the stoichiometric quantity of a base to the polynitro compound in water or in alcohol.

Suitable bases include, for example, NaOH, KOH, LiOH, RbOH, CsOH, Ca(OH)$_2$, Mg(OH)$_2$, Ba(OH)$_2$ and Sr(OH)$_2$.

The solution of mono salt which is obtained can be used for oxidation without isolating the salt or the salt can be isolated by evaporation of the water or alcohol below abut 50° C. or by precipitation of the salt by addition of the salt solution to a solvent in which it is insoluble such as acetone or ethyl ether.

Mono salts of the dinitro compounds can also be prepared by displacement reactions. For example, the Ca salt of dinitroneopentane can be prepared by treating an alcoholic solution of Na dinitroneopentane with CaCl$_2$. The insoluble calcium salt precipitates.

The oxidation of the mono salt can be carried out by adding the nitric acid to the solution of mono salt or by adding the solution of mono salt to aqueous nitric acid.

The concentration of the nitric acid usable in the subject process can range from about 10% to about 70%. This concentration of nitric acid is calculated from the total nitric acid and total water in the mix. The concentration of nitric acid and the reaction temperature are interrelated; the higher the concentration of nitric acid, the lower the reaction temperature required in order to prevent excessive decomposition of the materials being oxidized. The preferred range of nitric acid concentration is from about 35 to about 70%.

The oxidation process of the present invention can be carried out from about room temperature, i.e., 25° C., to about 200° C. and at pressures from about atmospheric to autogenous pressures of about 10 atmospheres or higher. The system can be pressurized by inert gases such as nitrogen but, in general, no advantage is gained thereby. The higher temperatures increase the rate of reaction but also increase the possibility of side reactions such as over-oxidation, carbon-carbon bond scission and others. The reaction can be carried out in batch or continuous fashion. In the batch reaction, for example, all of the ingredients are charged to a vessel which is then held at the necessary temperature for the necessary period. The product is then removed from the vessel and treated to recover the desired nitro acid.

In a continuous process the ingredients are pumped through a pipe sufficiently long to give the desired reaction time and product stream continuously removed from the other end and treated to recover the nitro acid.

Conventional catalysts can be added to the reaction system to reduce the induction period before beginning of the oxidation. These catalysts are generally metals or metallic oxides which reduce a small quantity of the nitric acid to NO and/or NO$_2$ which then reacts with water to form nitrous acid. Nitrous acid acts more rapidly as an oxidizing agent than nitric acid thus affording a means of eliminating the induction period. However, nitric acid alone can be used as the oxidizing agent without the introduction of the catalysts. Catalysts conventionally used are copper or vanadium pentoxide.

Recovery of the nitro acids formed by the oxidation is accomplished by conventional means. The nitro acid can be extracted by a water-immiscible organic solvent for it. The organic extract can be then extracted by aqueous base such as aqueous sodium bicarbonate or aqueous sodium carbonate to remove the nitro acid. The basic solution is then acidified and the nitro acid separates. Conventional char treatments can be used for purification, if desired.

The nitro acid can also be purified by recrystallization from organic solvents by conventional means.

The nitro acids formed by the process of the invention are converted to amino acids by catalytic hydrogenation by conventional catalytic methods. For example, see "Catalysis," Emmett, Vol. III, Reinhold, 1955, pages 149–168. These amino acids are converted to useful polymers by conventional condensation polymerization techniques.

For example see "Polymer Processes," Schildknecht, Interscience, 1956, pages 235 to 294.

The invention is illustrated by the following examples which are not intended to be limiting. Parts and precentages are by weight.

*Example 1.—Preparation of sodium dinitroneopentane*

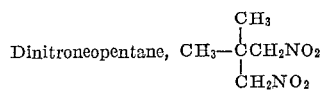

is prepared by conventional means by the condensation of acetone and nitromethane in the presence of a piperidine catalyst (see U.S. Patent 2,383,603).

Dinitroneopentane (162 parts) is dissolved in 500 parts of 95% ethanol. A solution of 40 parts of sodium hydroxide in 200 parts of 95% ethanol is added and mixed well. The solution is then added to 2000 parts of acetone. The solid which separates is filtered off and washed with acetone. It is sodium dinitroneopentane. The infrared spectrum of the solid in a KBr pellet shows a strong band at 6.34$\mu$ (salt group) and 6.45$\mu$ (nitro group).

Potassium dinitroneopentane is prepared as above by substituting 56 parts of KOH for the NaOH. The potassium dinitroneopentane shows a strong absorption band in the infrared (KBr pellet) at 6.38$\mu$ with a shoulder at 6.35$\mu$.

The calcium salt of dinitroneopentane is prepared by substituting 37 parts of Ca(OH)$_2$ for the NaOH used above.

*Example 2*

2-methyl-2-nitromethyl-1-nitrobutane is prepared as is described for dinitroneopentane in Example 1 by substituting methyl ethyl ketone for acetone on an equimolar basis. The mono sodium salt of 2-methyl-2-nitromethyl-1-nitrobutane is prepared by the procedure of Example 1 substituting the dinitrobutane for the dinitroneopentane in equimolar quantity.

*Example 3*

The calcium salt of dinitroneopentane is prepared by dissolving 185 parts of sodium dinitroneopentane in 500 parts of water and adding a solution of 219.1 parts of CaCl$_2$·6H$_2$O in a liter of water. The calcium salt precipitates out of solution and is filtered off.

*Example 4*

Sodium dinitroneopentane (46 parts) is dissolved in 250 parts of water. 70% HNO$_3$ (350 parts) is placed in a flask fitted with a stirrer, thermometer, dropping funnel, and reflux condenser, and then heated with a mantle to 100° C. The heating source is turned off and the solution of sodium dinitroneopentane added dropwise at such a rate that the temperature stays between 95–100° C. The total addition time is 30 min. The reaction is maintained at 95–100° C. for an additional hour. The reaction is then cooled and N$_2$ blown through to remove dissolved nitrogen oxides. The clear light green solution is chilled for 24 hrs. at which time a white, crystalline precipitate has precipitated. The precipitate is filtered off, dried, and recrystallized from CHCl$_3$—CCl$_4$ to give 15.0 parts of nitropivalic acid. It melts sharply at 86–87° C. Its identity as nitropivalic acid is confirmed by NMR. Its spectrum shows three singlet peaks at 1.46$\delta$ (methyl), 4.77$\delta$ (methylene), and 12.56$\delta$ (carboxyl), with the peak area ratios 6:2:1.

*Analysis.*—Calcd. for C$_5$H$_9$O$_4$N: C, 40.8; H, 6.12; N, 9.52. Found: C, 40.7, 40.7; H, 6.22, 6.56; N, 9.34, 9.40.

The above procedure is repeated using the lithium salt of dinitroneopentane with similar results.

*Example 5*

The sodium 2-nitromethyl-2-methyl-1-nitrobutane (30 parts) is dissolved in 100 parts of water and this solution added dropwise to 70% HNO$_3$ (280 parts) heated to 95° C. Addition time is 30 min. The reaction is heated to 105° C. for 15 min. and cooled. The solution is extracted continuously over 2 days with CHCl₃. This solution is concentrated and in turn extracted with 5% NaHCO₃ solution. The NaHCO₃ solution is extracted once with ether and then acidified. The oil which separates after the acidic solution is saturated with NaCl is taken up in chloroform. The chloroform solution is dried and then evaporated under vacuum to leave a yellow oil which slowly solidifies. The solid product is dissolved in a minimum amount of ethyl ether. This solution is diluted about 6-fold with petroleum ether and cooled in a Dry Ice bath. The solid which precipitates is filtered off, washed with petroleum ether and dried. The yield is 5.0 parts of 2-nitromethyl-2-methylbutyric acid, a white solid, M.P. 63° C.

*Analysis.*—Calcd.: C, 44.7; H, 6.83; N, 8.70. Found: C, 45.2, 45.0; H, 7.12, 6.96; N, 8.37, 8.55.

The above procedure is repeated using the calcium salt of 2-nitromethyl-2-methyl-1-nitrobutane with similar results.

*Example 6*

70% nitric acid (210 parts) is placed in a reactor fitted with stirrer, thermometer, and reflux condenser. The nitric acid is heated to 85° C. and approximately 0.1 part of copper metal and 0.1 part of V₂O₅ is added. Potassium 2-nitromethyl-2-methylnitropentane (38 parts) in 75 parts of water is added at such a rate that the temperature of the aqueous solution remains at 92–96° C. After the addition the reaction mixture is cooled, blown with nitrogen to remove nitrogen oxides, and extracted with chloroform several times. The chloroform extracts are then combined, extracted with several portion of aqueous NaHCO₃. The aqueous NaHCO₃ extracts are extracted several times with ether and the aqueous phase acidified. An oil separates which solidifies slowly. After recrystallizing by dissolving in ethyl ether, adding petroleum ether until cloudiness appeared and chilling in a Dry Ice bath, the 2-nitromethyl-2-methylpentanoic acid melts at 58–59° C.

*Analysis.*—Calcd. for C₇H₁₃NO₄: C, 48.0; H, 7.43; N, 8.0. Found: C, 48.4; H, 7.52; N, 8.05.

Infrared shows a strong peak at 5.85μ (carbonyl) and at 6.42μ (nitro).

*Example 7*

1,1-bis(nitromethyl)cyclohexane is prepared by the same procedure as dinitroneopentane of Example 1 and its sodium salt is prepared as the sodium salt of dinitroneopentane.

1,1-bis(nitromethyl)cyclohexane, monosodium salt (12 parts) is dissolved in 40 parts of water and added slowly to 140 parts of 70% HNO₃ maintaining the temperature at 90–100° C. over a period of 15 min. The mixture is then cooled and extracted wtih chloroform. The chloroform extract is extracted with NaHCO₃ solution and discarded. The NaHCO₃ solution is extracted once with ether and then acidified which causes the separation of an oil. This oil is taken up in chloroform and the resultant solution dried over MgSO₄ and evaporated. The residue slowly crystallizes to yellow crystals which are washed with cold chloroform to give colorless crystals of 1-nitromethyl cyclohexane carboxylic acid, M.P. 79–80° C.

*Analysis.*—Calcd. for C₁₂H₁₃NO₄: C, 51.3; H, 6.95. Found: C, 51.3; H, 7.06.

The infrared spectrum shows typical acid absorption at 3.9μ, very strong carbonyl absorption at 5.85μ, and very strong nitro absorption at 6.42μ.

I claim:
1. A compound represented by the formula

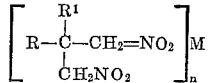

where R and R¹ taken separately are 1–20 carbon alkyl and where R and R¹ taken together are a bridging radical of up to 20 carbon atoms which forms a saturated carbocyclic ring with the quaternary carbon to which it is attached, M is selected from the group consisting of alkali and alkali earth metal, and n is a number equal to the valence of M.

2. The product of claim 1 wherein M is an alkali metal.
3. The product of claim 1 wherein M is sodium.
4. A compound represented by the formula

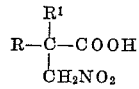

in which

is a saturated alicyclic hydrocarbon radical of up to 20 carbon atoms.

5. The product of claim 4 in which

is cyclohexylidene radical.

6. A process for the preparation of a nitro acid represented by the formula

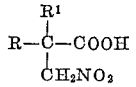

in which R and R¹ taken separately are 1–20 carbon alkyl, and where R and R¹ taken together are a bridging radical of up to 20 carbon atoms which forms a saturated carbocyclic ring with the quaternary carbon to which it is attached, which comprises treating a salt represented by the formula

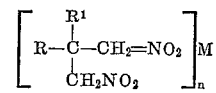

wherein M is selected from the group consisting of alkali and alkali earth metals, n is a number equal to the valence of M and R and R¹ have the aforesaid signifiicance, with aqueous nitric acid of a concentration from about 10% to about 70% at a temperature from about 25° C. to about 200° C.

7. The process of claim 6 wherein R and R¹ are methyl.
8. The process of claim 6 wherein R is methyl and R¹ is ethyl.
9. The process of claim 6 wherein the temperature of oxidation is about from 75° to 110° C.
10. Compounds selected from the group consisting of:

(a) 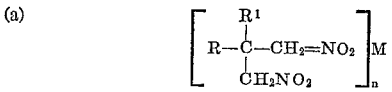

(b) 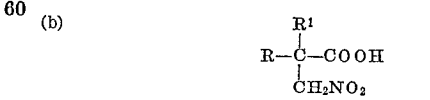

where R and R¹ taken separately are 1 to 20 carbon alkyl and where R and R¹ taken together are a bridging radical of up to 20 carbon atoms which forms a saturated carbocyclic ring with the quaternary carbon to which it is attached, M is selected from the group consisting of alkali and alkali earth metal, n is a number equal to the valance of M and where, in (b), R and R¹ are taken together.

No references cited.

CARL D. QUARFORTH, *Primary Examiner.*